United States Patent

[11] 3,633,748

| [72] | Inventors | James O. Hanley<br>Minnetonka;<br>Michael J. Lynch, Bloomington, both of Minn. |
|---|---|---|
| [21] | Appl. No. | 108,797 |
| [22] | Filed | Jan. 22, 1971 |
| [45] | Patented | Jan. 11, 1972 |
| [73] | Assignee | Crest Industries, Inc.<br>Minnetonka, Minn. |

[54] PORTABLE WATER-TREATING APPARATUS
5 Claims, 1 Drawing Fig.

[52] U.S. Cl. .................................................. 210/97,
210/186, 210/259
[51] Int. Cl. ...................................................... B01d 23/10
[50] Field of Search............................................ 210/27, 97,
186, 258, 259

[56] References Cited
UNITED STATES PATENTS

| 3,118,833 | 1/1964 | Reinhardt..................... | 210/259 X |
| 3,276,458 | 10/1966 | Iversen et al................. | 210/259 X |
| 3,408,289 | 10/1968 | Gustafson..................... | 210/27 |

*Primary Examiner*—Samih N. Zaharna
*Attorney*—Merchant & Gould

ABSTRACT: A housing having a water pump mounted therein so as to receive water from a reservoir by gravity flow and supply water to a first container partially filled with activated carbon. A blend of water flowing directly from the first container and water flowing from the first container through a second container filled with ion exchanger material is introduced into a third container having an ultraviolet radiating lamp mounted therein to eliminate bacteria and virus from the water. Water from the third container is heated or cooled as desired and is then ready for consumption. The various containers and the reservoir are formed of a low-density plastic.

PATENTED JAN 11 1972
3,633,748
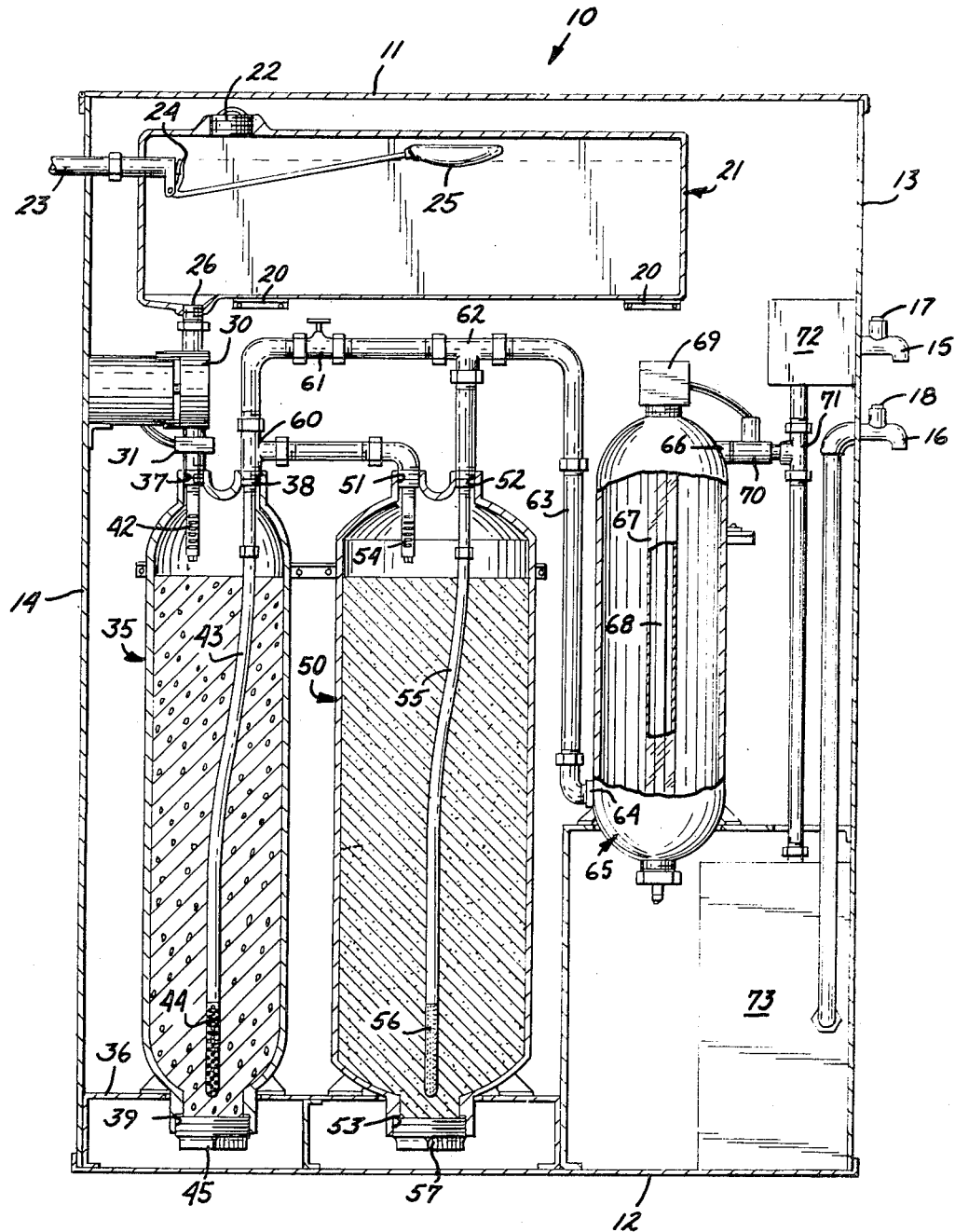
INVENTORS.
JAMES O. HANLEY
MICHAEL J. LYNCH
BY
Merchant & Gould
ATTORNEYS

3,633,748

PORTABLE WATER-TREATING APPARATUS

BACKGROUND OF THE INVENTION

1. Field of the Invention

The present invention pertains to portable water-treating apparatus and may be, for example, the equipment commonly used in offices, working areas, etc., commonly referred to as a water cooler. At the present time water coolers generally heat and/or cool water which has been purified and the water is utilized for making beverages, such as coffee, tea and the like, or is simply cooled and utilized to quench the thirst. It is essential that these water coolers are portable and simple to operate and that they provide water sufficiently pure for human consumption.

2. Description of the Prior Art

Prior art portable water-treating devices include essentially a base having heating and/or cooling apparatus mounted therein and some means for mounting large bottles of pretreated or purified water thereon. The bottled water flows through the apparatus by gravity feed and is accessible through hot and/or cold spigots therebelow. These systems are relatively unsatisfactory because the water is expensive and the device requires bottles of the specially pretreated water, which is inconvenient. When excessive amounts of water are used it is necessary to have spare bottles of water available or a service man must be summoned.

SUMMARY OF THE INVENTION

The present invention pertains to improved portable water-treating apparatus which includes a housing with controllable outlet means attached thereto and a reservoir connected to the inlet of a first waterproof container at least partially filled with activated carbon, the outlet of which is connected through a second waterproof container at least partially filled with ion exchanger material to the inlet of a third waterproof container having ultraviolet-radiating means therein and through a manually operable restriction valve directly to the inlet of the third container to supply a blend of water having sufficient minerals therein to provide a desired taste, the outlet of the third container attached through heating or cooling apparatus to the controllable outlet.

It is an object of the present invention to provide improved portable water-treating apparatus.

It is a further object of the present invention to provide portable water-treating apparatus which is essentially self-contained and substantially purifies water supplied thereto.

It is a further object of the present invention to provide portable water-treating apparatus which is relatively simple and inexpensive to manufacture and operate.

These and other objects of this invention will become apparent to those skilled in the art upon consideration of the accompanying specification, claims and drawing.

DESCRIPTION OF THE DRAWING

The single drawing is a sectional view of improved portable water-treating apparatus, portions thereof broken away.

DESCRIPTION OF THE PREFERRED EMBODIMENT

In the FIGURE the numeral 10 generally designates a box-shaped housing containing the improved water-treating apparatus. The housing 10 has a top 11, a bottom 12, a front wall 13, a rear wall 14 and two sidewalls (not shown). This specific portable water-treating apparatus is designed for offices, working spaces and the like wherein hot and cold substantially pure water is desired. A first spigot 15 for hot water and a second spigot 16 for cold water are affixed in the front wall 13. Each of the spigots 15 and 16 includes a control valve and a manually operable button 17 and 18, respectively, for operating the valve to allow water to flow from the spigots 15 and 16. It should be understood that variations on the form of the housing 10 and different types of controllable outlet means, including either or both hot and cold water, might be utilized by those skilled in the art. The top 11 is hinged along the rear edge thereof to provide access to the apparatus within the housing 10.

A pair of brackets 20 are affixed between the sidewalls and form a shelf to mount a reservoir 21. An opening having a plug 22 threadedly engaged therein is provided in the upper surface of the reservoir 21 for filling and/or cleaning the reservoir 21. Also, an inlet conduit 23 extends through the rear wall 14 of the housing 10 and the rear wall of the reservoir 21. A float valve 24, having a float 25 attached thereto, is mounted on the end of the inlet conduit 23 within the reservoir 21. The inlet conduit 23 may be connected to a source of water under pressure or any suitable means for introducing water into the reservoir 21. The float valve 24 prevents pressure from building within the reservoir 21, in the event the inlet conduit 23 is connected to a source of water under relatively high pressure. It should be understood that either the opening and plug 22 or the inlet conduit 23, float valve 24 and float 25 might be eliminated in certain circumstances if desired. An outlet 26 is provided in the bottom of the reservoir 21 for water to flow therethrough under the force of gravity. While a specific embodiment and position of the reservoir 21 is illustrated, it should be understood that modifications and alterations may be made by those skilled in the art.

A pump 30 is affixed to the inner surface of the rear wall 14 below the reservoir 21 and with the inlet thereof connected to the outlet 26 to receive water from the reservoir 21. The reservoir 21 is mounted with the pump 30 therebelow so that water is supplied to the pump 30 by gravitational force and the pump 30 can be made small and inexpensive, because there is no necessity for priming and the like. A pressure sensor 31 is mounted adjacent the outlet of the pump 30 to sense the downstream pressure therefrom. The sensor 31 is electrically connected to the pump 30 to control the operation thereof and to cause the pump 30 to operate to provide a constant flow of water when either of the spigots 15 or 16 are opened. It should be understood that the pump 30 and sensor 31 might be positioned anywhere in the waterflow path between the reservoir 21 and spigots 15 and 16, as long as the pump 30 is positioned to receive water under the force of gravity, and the specific positions illustrated are simply for explanatory purposes.

A first elongated container 35 is mounted in a generally upright position within the housing 10 adjacent the rear wall 14 on a false bottom 36. The container 35 has an inlet 37 and an outlet 38 formed in the upper end thereof and an opening 39 at the lower end thereof for replacing material therein. A short tubular screen 42 is affixed in the inlet 37 within the container 35 for removing large particles of foreign material from water entering the inlet 37. An elongated stand pipe 43 having a screen 44 at the lower end thereof is affixed in the outlet 38 within the container 35 so that the screen 44 is adjacent the lower end of the container 35. A removable plug 45 is threadedly engaged in the opening 39 to render the container 35 waterproof or impermeable to water.

The inlet 37 of the container 35 is connected to the outlet of the sensor 31 to receive the flow of water passing therethrough. The container 35 is filled with activated carbon to a level slightly below the lower end of the screen 42. Water entering the inlet 37 from the pump 30 and sensor 31 passes downwardly through the activated carbon bed and enters the stand pipe 43 through the screen 44. As the water flows through the activated carbon bed color, odor, chlorine and organics present therein are substantially reduced. After extended periods of usage a reverse flow of water can be applied to the container 35 to backwash the activated carbon and clean the foreign materials therefrom or the activated carbon can be removed through the opening 39 and replaced or cleaned. It should be understood that the illustrated embodiment is utilized for the specific purpose previously described and that various modifications and alterations of the specific configuration might be designed by those skilled in the art.

A second elongated container 50, having a length approximately equal to the container 35 and a slightly larger diameter, is mounted on the false bottom 36 in a generally upright position adjacent the first container 35. The second container 50 is constructed similar to the first container 35 with an inlet 51 and an outlet 52 in the upper end thereof and an opening 53 in the lower end thereof. The inlet 51 has an elongated screen 54 affixed therein and the outlet 52 has a stand pipe 55 affixed therein with a screen 56 affixed to the lower end thereof. The opening 53 has a plug 57 threadedly engaged therein to render the container 50 waterproof and the inner portion thereof accessible.

The second container 50 is filled to a level slightly below the lower end of the screen 54 with an ion exchanger having a combination of strong acid cation exchange resins and strong base anion exchange resins, examples of which are zeolites, chemicals sold under the trademark "AMBERLITE" and other ion exchange resins. The cation and anion exchange resins are intimately mixed in a ratio of approximately 1:1.5 and introduced into the container 50, through the opening 53, as a slurry. The specific ratio of the cation exchange resins to the anion exchange resins will depend, to some extent, upon the mineral content of the untreated water available in the area of use of the apparatus. The ion exchange bed functions to reduce the mineral content present in water passing therethrough. Mineral ions present in water as cations are exchanged for hydrogen ions of the acid cation exchange resin, mineral ions present in the water as anions are exchanged for hydroxide ions of the base anion exchange resins and released hydrogen and hydroxide ions combine to form additional water molecules. The ion exchange bed in the container 50 can be regenerated by removing the slurry from the container 50 and flooding it with a strong salt solution, carbonate solutions, etc. (depending upon the cation exchange resins and anion exchange resins utilized) to produce a reverse exchange of anions and cations. The ion exchange material is then returned to the container 50 and the water-treating process continued.

The outlet 38 of the container 35 has a T-shaped conduit 60 threadedly engaged therein with one arm of the T-shaped conduit 60 connected to the inlet 51 of the container 50 and the other arm connected to a manually operable restriction valve 61. The opposite or outlet end of the restriction valve 61 is connected to one arm of a T-shaped conduit 62. A second arm of the T-shaped conduit 62 is connected to the outlet 52 of the container 50. A third arm of the T-shaped conduit 62 serves as an outlet and is connected through conduit 63 to an inlet 64 of a third container 65.

In the operation of the containers 35 and 50 and the means connecting them to the inlet 64 of the container 65, water which passes through the container 35 and has color, odor, chlorine and organics removed therefrom by the activated carbon bed may pass into the container 50 and through the ion exchange bed to the container 65 or directly through the restriction valve 61 to the container 65. The restriction valve 61 is manually adjusted to allow a certain percentage of water to pass from the container 35 directly to the container 65 with minerals still present therein. Because water passing through both the activated carbon bed and the ion exchange bed is substantially tasteless, it is generally desirable to blend some water-containing minerals therewith. The amount of water passing through the restriction valve 61 and blending with water flowing from the outlet 52 of the container 50 is dependent upon the desired final taste and will generally be reduced as the mineral content of the water contained in the reservoir 21 becomes greater. It should be understood that variations of the bypass and blending of the water might be devised and the present system is simply for explanatory purposes.

The third container 65 is an elongated container substantially smaller than the containers 35 and 50 and is mounted on a vertically extended portion of the false bottom 36. The inlet 64 of the container 65 is generally transverse to the longitudinal axis and adjacent the lower end of the container 60. An outlet 66 in the container 65 is generally transverse to the longitudinal axis and positioned adjacent the upper end of the container 65. A transparent quartz tube 67 is coaxially affixed within the container 65 so as to extend therethrough and outwardly a short distance from each end thereof. The ends of the container 65 are sealed to the quartz tube 67 by some convenient means so that the container 65 is waterproof or imperforate and water entering the inlet 64 must egress through the outlet 66. An elongated ultraviolet lamp 68 is mounted coaxially within the quartz tube 67 so that the electrical connections thereto are available at each end thereof. A terminal box and ultraviolet sensor 69 is affixed to the upper end of the container 65 and is adapted to receive electrical connections for suitable electrical power therein. The connections for energizing the ultraviolet lamp 68 are connected into the terminal box and sensor 69. Power may be supplied continually to the terminal box 69 or may be controlled so that it is applied only when water is withdrawn from the apparatus.

In the operation of the third container 65, water flowing through the conduit 63 enters the container 65 and flows upwardly around the quartz tube 67 to the outlet 66. With the ultraviolet lamp 68 properly energized all of the water must pass through ultraviolet radiation from the lamp 68, which radiation substantially eliminates or reduces any bacteria or virus which is present in the water. To insure proper operation of the ultraviolet lamp 68 during withdrawal of water from the apparatus, a sensor (not shown) may be included in the box 69, which sensor is electrically connected to operate a solenoid valve 70 connected to the outlet 66 of the container 65. Whenever the lamp 68 is deenergized and the sensor does not sense ultraviolet radiation the solenoid valve 70 is closed and no water can be withdrawn from the apparatus. It should be understood that this safety device is optional and may not be desired in all apparatus.

The outlet of the solenoid valve 70 is connected to a T-shaped conduit 71, one arm of which is connected to a heating element 72 and the other arm of which is connected to a cooling element 73. The spigot 15 is connected to the outlet of the heating element 72 and the spigot 16 is connected to the outlet of the cooling element 73. Thus, in this embodiment, when power is applied to the box 69 and the lamp 68 is properly energized depressing either of the buttons 17 or 18 provides a flow of water at the spigots 15 or 16, respectively, which water is substantially purified and controlled, by the blending of mineral-containing water therein, to a desired taste. While heating and cooling elements 72 and 73, respectively, and two spigots 15 and 16 are illustrated, it should be understood that either or both heating and cooling systems might be incorporated or the water might be simply withdrawn at ambient temperature.

The reservoir 21, the container 35, the container 50 and the container 65 are constructed from a low-density plastic and may be for example a linear polyethylene or the like. All of the components, including the various conduits, if desired, may be constructed from relatively inexpensive materials because the pressures which they must withstand are relatively low. Providing the float valve 24 in the inlet to the reservoir 21 or simply providing a reservoir which must be manually and periodically filled, insures low-fluid pressures throughout the apparatus. Further, the pump 30 is situated so that it does not require priming and the like and therefore can be a very inexpensive pump while insuring a constant and substantial flow of water through the apparatus. Thus, improved portable water-treating apparatus is disclosed which is relatively simple and inexpensive to manufacture and which may be completely portable or may be attached to a source of water under pressure.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:
1. Improved portable water treating apparatus comprising:
   a. a housing having controllable outlet means for treated water mounted thereon
   b. a reservoir mounted within said housing for containing a supply of untreated water;
   c. a first waterproof container having an inlet attached to said reservoir for receiving untreated water therefrom and an outlet, said first container being at least partially filled with activated carbon;
   d. a second waterproof container having an inlet connected to the outlet of said first container and an outlet, said second container being at least partially filled with ion exchanger material for reducing the mineral content of water flowing therethrough;
   e. a third waterproof container having an inlet connected to the outlet of said first container and to the outlet of said second container for receiving water at least partially from each of said first and second containers simultaneously and an outlet, said third container having ultraviolet-radiating means mounted therein so that water flowing from the inlet to the outlet passes through the ultraviolet radiation for eliminating bacteria and virus in the water; and
   f. means connecting the outlet of said third container to said controllable outlet means.

2. Improved portable water-treating apparatus as set forth in claim 1 wherein a pump is connected in the waterflow between the reservoir and the controllable outlet means and the apparatus further includes a pressure sensor operatively attached to the pump for producing operation of the pump when the pressure at the controllable outlet means drops below a predetermined value.

3. Improved portable water-treating apparatus as set forth in claim 2 wherein the pump is connected to the reservoir adjacent the bottom of said reservoir for supplying water from said reservoir to said pump by gravity feed.

4. Improves portable water-treating apparatus as set forth in claim 1 wherein the reservoir, the first container and the second container are constructed of a low-density plastic.

5. Improved portable water-treating apparatus as set forth in claim 1 wherein the controllable outlet means includes a first faucet for hot water and a second faucet for cold water and the connecting means includes means for heating water connected between the outlet of the third container and the first faucet and means for cooling water connected between the outlet of the third container and the second faucet.

* * * * *